Dec. 14, 1971   J. A. CUPLER II   3,626,644
METHOD OF MAKING SOLID DIAMOND DRILLS
Filed July 17, 1969   9 Sheets-Sheet 1
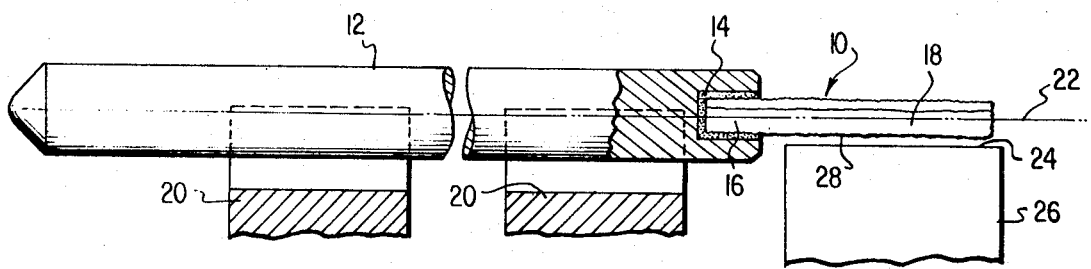
FIG. 1
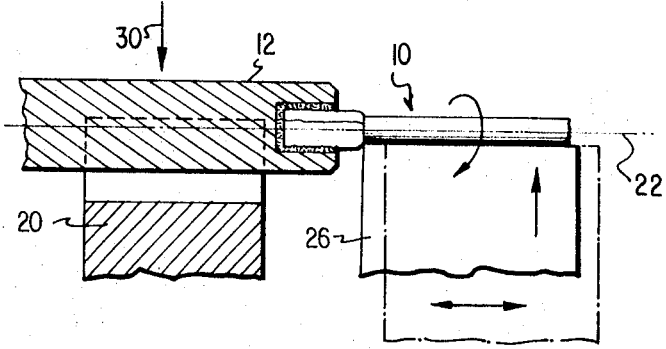
FIG. 2
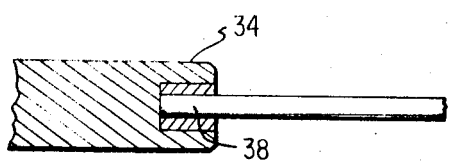
FIG. 6
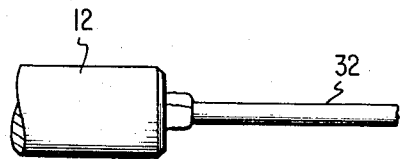
FIG. 3
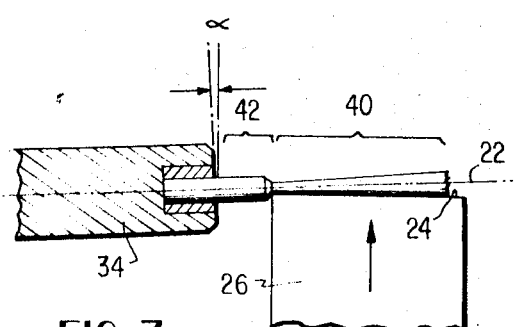
FIG. 7
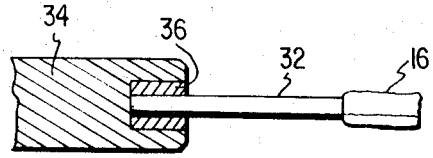
FIG. 4
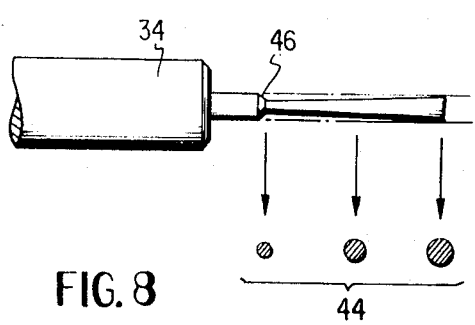
FIG. 5
FIG. 8
INVENTOR
JOHN A. CUPLER, II
BY   Colton + Stone
ATTORNEYS.

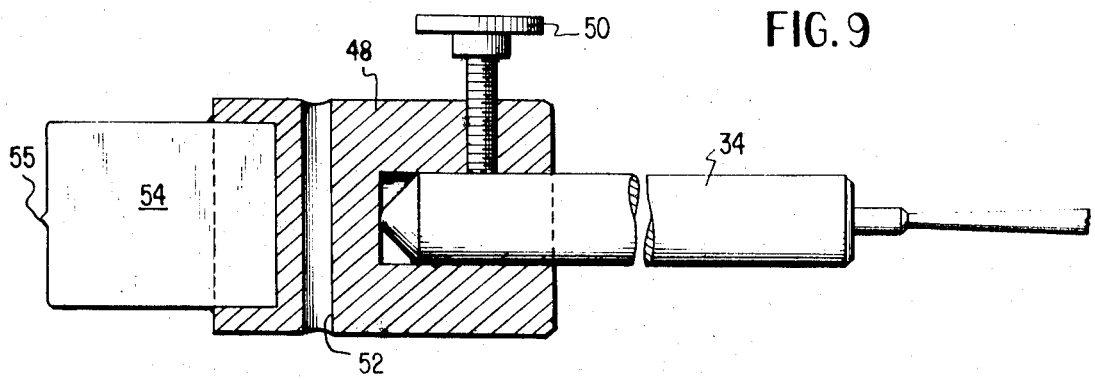
FIG. 9
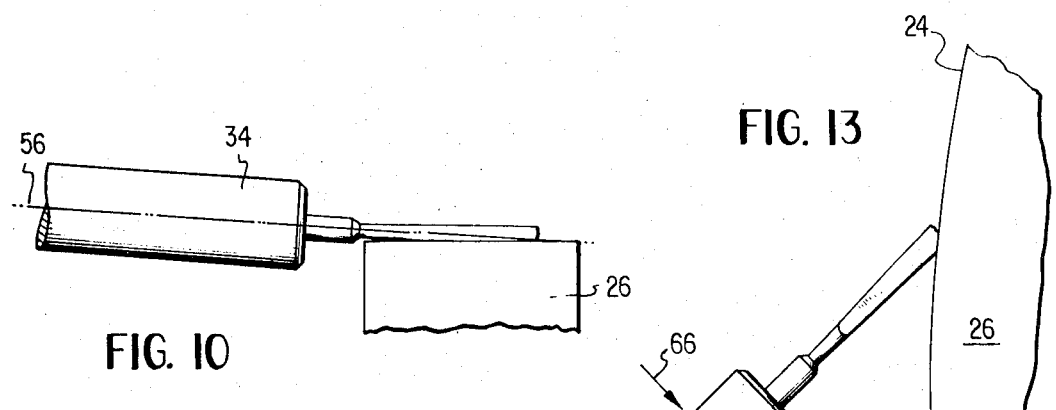
FIG. 10
FIG. 13
FIG. 11
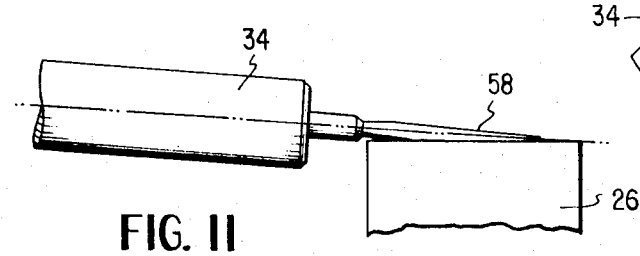
FIG. 12
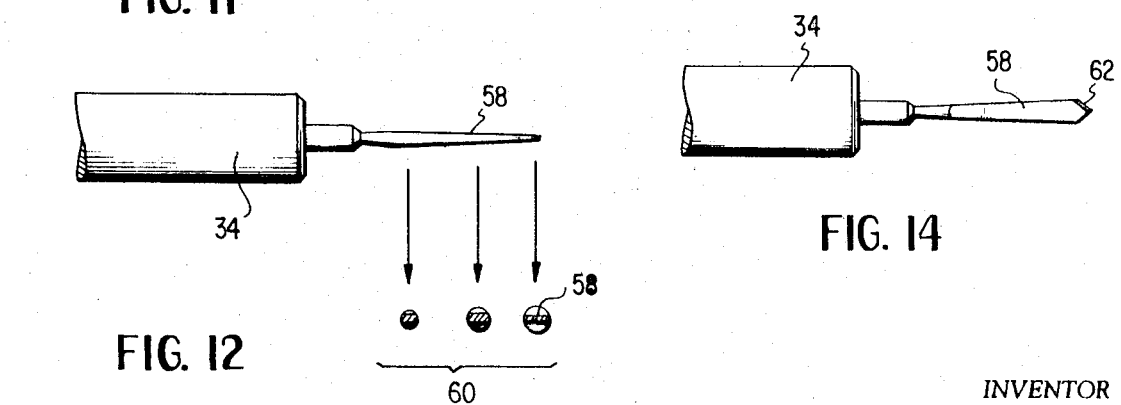
FIG. 14
INVENTOR
JOHN A. CUPLER, II
BY Colton + Stone
ATTORNEYS.

Dec. 14, 1971  J. A. CUPLER II  3,626,644
METHOD OF MAKING SOLID DIAMOND DRILLS
Filed July 17, 1969  9 Sheets-Sheet 4

INVENTOR
JOHN A. CUPLER, II

BY *Colton + Stone*

ATTORNEYS.

Dec. 14, 1971   J. A. CUPLER II   3,626,644
METHOD OF MAKING SOLID DIAMOND DRILLS
Filed July 17, 1969   9 Sheets-Sheet 5

INVENTOR
JOHN A. CUPLER, II

BY  *Colton + Stone*

ATTORNEYS.

Dec. 14, 1971    J. A. CUPLER II    3,626,644
METHOD OF MAKING SOLID DIAMOND DRILLS
Filed July 17, 1969    9 Sheets-Sheet 7
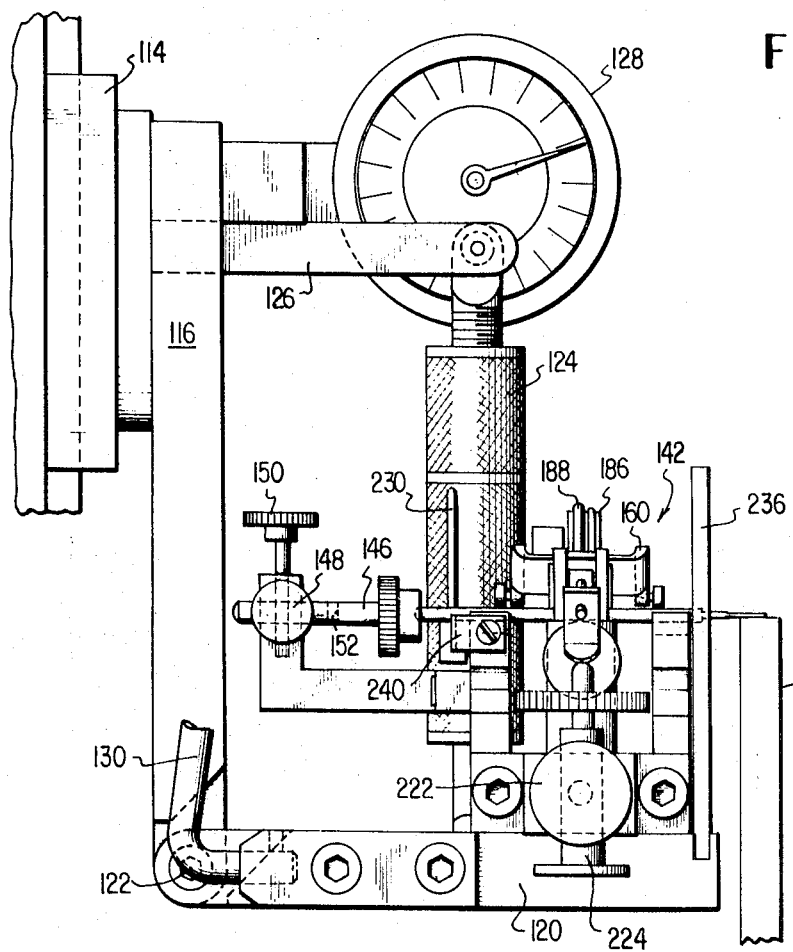
FIG. 20
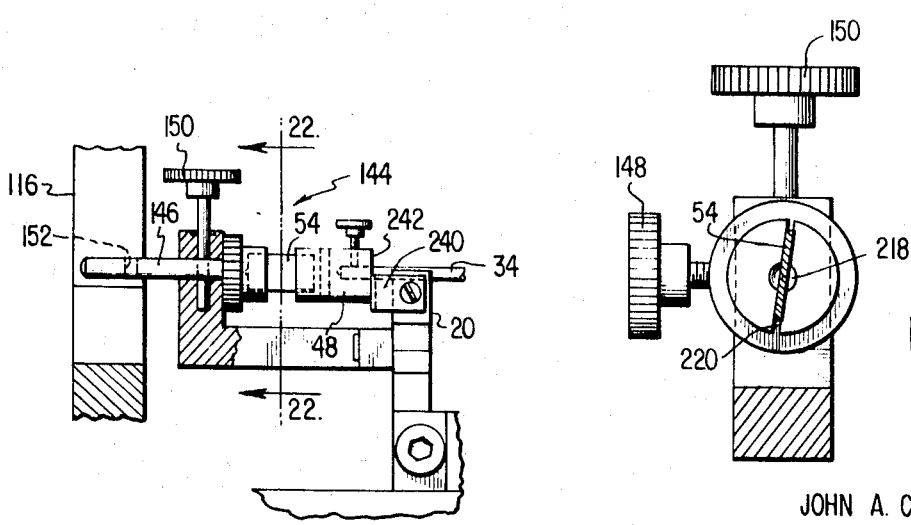
FIG. 21
FIG 22
INVENTOR
JOHN A. CUPLER, II
BY Colton + Stone
ATTORNEYS Dec. 14, 1971 J. A. CUPLER II 3,626,644
METHOD OF MAKING SOLID DIAMOND DRILLS
Filed July 17, 1969 9 Sheets-Sheet 8

INVENTOR
JOHN A. CUPLER, II

BY Colton + Stone

ATTORNEYS.

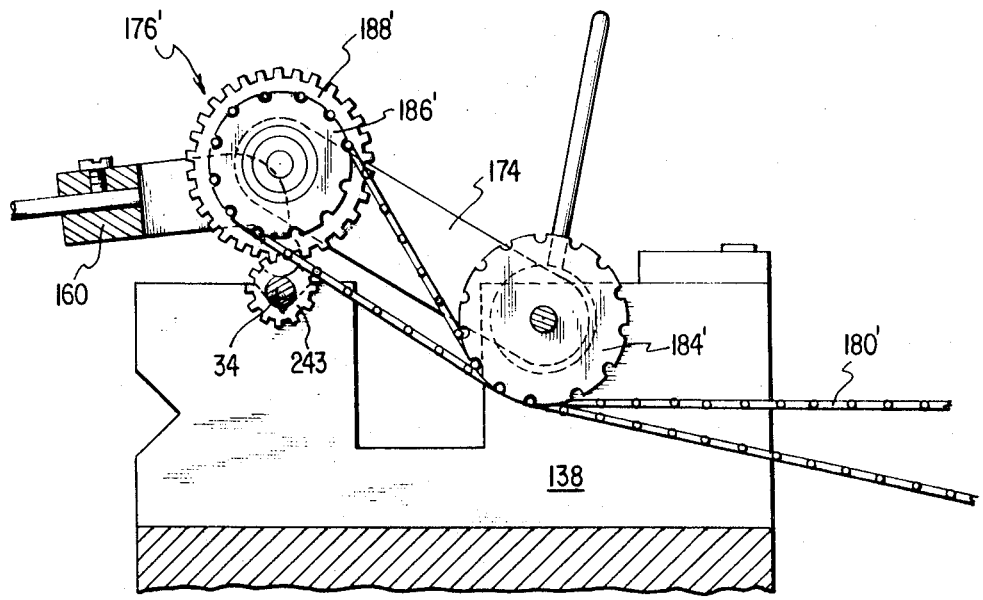
FIG. 26
FIG. 27
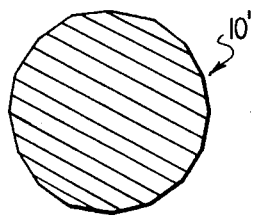
FIG. 28
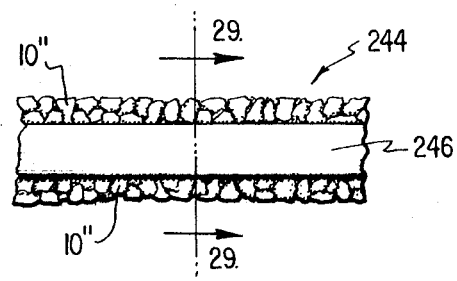
FIG. 29
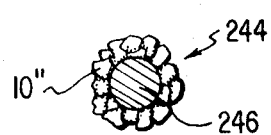
INVENTOR
JOHN A. CUPLER, II
BY *Colton + Stone*
ATTORNEYS.

United States Patent Office 3,626,644
Patented Dec. 14, 1971

3,626,644
METHOD OF MAKING SOLID DIAMOND DRILLS
John A. Cupler II, 10 Cupler Drive-La Vale,
Cumberland, Md. 21401
Filed July 17, 1969, Ser. No. 842,488
Int. Cl. B24b 1/00
U.S. Cl. 51—288   14 Claims

ABSTRACT OF THE DISCLOSURE

A method of machining solid drills wherein such drills are machined without regard to natural cleavage lines. The drills are machined to a desired three-dimensional configuration by providing a yieldable engagement of the diamond with an endless machining member in accordance with the surfaces which are to be machined.

---

The invention is directed to a method of making solid diamond drills. A solid diamond drill is herein defined as a single or composite diamond structure having a solid or substantially solid exterior diamond surface which exterior surface is formed in the same overall configuration as steel or other type conventional drills and includes a shank portion which is adapted to be anchored or chucked to a rotary machine tool part, an intermediate neck portion and a shaped machining or working portion herein described as a blade portion of conventional configuration.

Inasmuch as the formation of a microdrill from a single diamond represents a higher order of technological advancement than does the formation of a composite diamond macrodrill, the detailed description of the method involved in the formation of diamond drills will be directed to the machining of microdrills from a single diamond followed by a more generalized description relating to macrodrills.

The so-called diamond drilling tools known to the prior art are conventional type tools that are tipped, encased or impregnated, in whole or in part, with diamond chips or dust which are adhered to or integated with the tool by adhesives or the like These methods of utilizing diamonds in connection with a machining tool are the only ones which were previously considered to be possible since a diamond may not be formed or shaped except by other diamonds or by fracture along natural cleavage lines. Previous attempts to shape very small or micro diamonds by grinding with other diamonds or diamond dust have been unsuccessful because such attempts have involved conventional grinding or lapping techniques wherein a workpiece is conventionally chucked or otherwise rigidly supported relative to a grinder or the like. A very small or micro diamond is unable to resist the substantial lateral forces developed during the abrading operation and, consequently, it cannot be shaped by conventional machining techniques into complex configurations.

The method of forming solid diamond drills herein disclosed depends upon the ability to position a diamond workpiece in a plurality of working positions relative to a working tool or tools wherein, in at least one of such working positions, the workpiece is controllably yieldably biased into machining engagement with a tool. The purpose of such yieldable engagement is to insure that the forces imparted to the diamond workpiece during the myriad of necessary machining operations to impart a conventional complex drill configuration thereto do not reach such proportions as would fracture the diamond.

Inasmuch as economic considerations dictate that a solid diamond drill machined from a single diamond must be quite small, such as in the size range of those tools normally used for microdrilling techniques, it is apparent that the forces, and particularly the lateral forces, that may be resisted by the diamond workpiece are quite small as in the range of a few grams. The method by which a diamond workpiece may thus be yieldably biased into machining engagement with at least one tool while yet insuring the precision formation of a complex conventional blade configuration to close predetermined tolerances constitutes one aspect of the invention.

Another important feature of the invention relates to the method of insuring that the workpiece will always return to a pre-established position relative to the machining equipment following displacement thereof against the bias of the yieldable means.

In its simplest form, the method herein disclosed involves supporting an elongated rough diamond workpiece for rotation about an axis adjacent the counter-rotating surface of a diamond machining tool; resiliently biasing the workpiece toward the axis of rotation thereof representing its nearest approach to the machining tool; periodically moving the axis of rotation in closer proximity to the machining tool until a desired configuration having a circular cross-section is achieved and then performing additional machining operations on the workpiece to further shape the circular cross-sectional configuration thereof to the desired drill configuration.

Alternatively, and in accordance with a separate embodiment of the invention; the workpiece may first be formed with a regular polygonal cross-sectional configuration by temporarily disrupting the rotation of the workpiece until a flat is machined and thereafter continuing to rotate and hold the workpiece against rotation until a desired number of flats or facets are formed. Once the multi-faceted diamond has been so formed the same may be used in a gem setting as jewelry or then continuously rotated and further machined to produce the circular cross-sectional configuration above referred to as an intermediate step in the formation of a drill.

The manner in which the foregoing steps are performed and the apparatus for carrying them out will become more apparent from the ensuing description when considered in conjunction with the accompanying drawings wherein:

FIGS. 1–14 are diagrammatic representations of successive operations employed in the formation of a typical diamond drill in accordance with the invention;

FIG. 20 is a fragmentary elevational view of the preliminary work station as seen from the left side of FIG. 19;

FIG. 21 is a fragmentary elevational detail view of the stop block and angular positioning assembly forming a part of the preliminary work station;

FIG. 22 is an enlarged cross-sectional view taken along line 22—22 of FIG. 21;

FIG. 26 is a more or less diagrammatic illustration of a modified drive system that may be used in the practice of the invention;

FIG. 27 is a cross-sectional view of a multi-faceted diamond workpiece that may be machined utilizing the modified drive arrangement shown in FIG. 26;

FIG. 28 is a fragmentary showing of the manner in which a composite rough diamond workpiece may be prepared for subsequent machining operations to form a composite macrodrill; and FIG. 29 is a cross-sectional view taken along the line 29—29 of FIG. 28.

Figure 15:
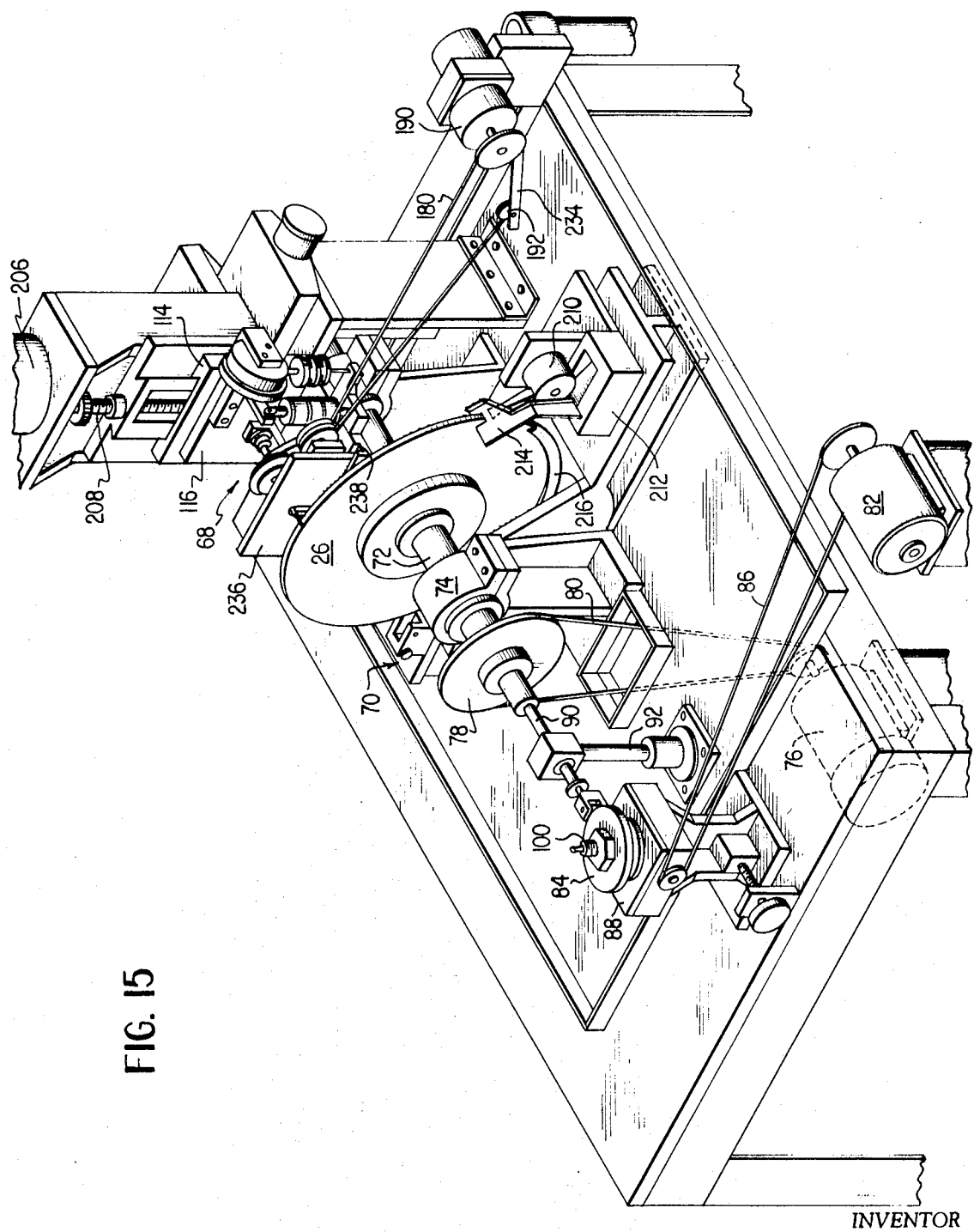
FIG. 15 is a rear perspective view of the machining equipment employed to practice the method herein disclosed.

The basic steps required to machine a solid diamond blade type microdrill are schematically illustrated in FIGS. 1–14. FIGS. 1–12 represent the operations performed at a preliminary work station and FIGS. 13 and 14 the operations performed at a finishing work station. A brief review of these figures will facilitate an understanding of the ensuing detailed description of the actual equipment utilized in the practice of the invention.

An elongated rough diamond chip 10, which may be of gem quality such as a chip remaining from a conventional diamond cutting and/or cleavage operation, is illustrated in FIG. 1 as being secured in the counterbored end of mandrel 12 as by a form setting material 14 having a low melting point such as soft solder or an appropriate adhesive. The particular diamond chip illustrated is generally triangular in cross-section as is usual in the case of chips remaining from conventional diamond fracturing, cleavage or "cutting" operations. The anchored or chucked end 16 of the chip may be approximately .050" and the exposed end of the chip would not normally exceed a length to diameter ($L/D$) ratio of about 7:1.

After chip 10 has been mounted in mandrel 12, the mandrel is positioned in V bearings 20, to be subsequently described, which define an axis 22 of chip rotation. The V bearings, mandrel and chip are then positioned as shown in FIG. 1 with axis 22 spaced above the cylindrical surface 24 of machining disc 26 which has a liquid suspension of diamond dust applied to cylindrical surface 24 thereof in a manner to be subsequently explained. The axis 22 is then lowered by a Z positioning mechanism on which the V bearings are supported until the high point or ridge 28 of chip 10 just engages cylindrical surface 24. Resilient biasing means schematically illustrated by arrow 30 in FIG. 2 urge the mandrel into full bearing engagement with conventional non-captive V bearings 20 and into axial coincidence with axis 22 defined by the V bearings. Chip 10 and disc 26 are counter-rotated as indicated in FIG. 2 in a manner which will be subsequently explained. The resilient bias imparted to mandrel 12 insures that chip 10 will rotate about axis 22 but can yield when a predetermined lateral force is applied thereto as when the high point 28 engages the disc during each 360° revolution. The chip, obviously, returns to its axis of rotation under the influence of bias 30 as the ridge is passed. As ridge 28 is gradually worn down the lateral forces applied to the chip, which may be on the order of three grams, will not be sufficient to deflect the chip away from the axis of rotation defined by the V bearings and it is this same degree of lateral thrust that the chip can tolerate without damage.

As the machining operation just described continues and the higher side of the diamond chip is ground away, axis 22 is periodically lowered toward surface 24 by a timing mechanism and automatic stepper motor until a portion 32 of the exposed end 18 of the chip is perfectly cylindrical as shown in FIG. 3. The diamond chip is then removed from the counterbored end of mandrel 12 after heating the same to melt material 14 or dissolving the same if not a thermosetting adhesive.

A second mandrel 34 is prepared with a counterbore containing a copper sleeve 36 whose inner diameter is approximately .0002" less than the cylindrical O.D. of chip end portion 32. Mandrel 34 is then heated slightly until it and the copper sleeve just start to expand, but not sufficient to anneal the mandrel, and approximately .050" of the cylindrical chip end is press fitted therein as shown in FIG. 4. The rough end portion 16 of chip 10 is now exposed for machining operations, as in FIG. 5, and it is machined to the same cylindrical dimension as end portion 32 in the manner previously described. This second operation on end portion 16 requires much less time since the axial length of the portion to be machined is much less and the lowering of axis 22 toward surface 24 may proceed in more rapid stepwise advancement.

At the stage of operation illustrated in FIG. 6, the diamond is now recognizable as a tool blank and that end of the diamond anchored or chucked in the counterbore of mandrel 34 will henceforth properly be referred to as the shank 38. Similarly, as will become more apparent as the description of FIGS. 7–14 proceeds, that exposed end portion of the diamond which will undergo further machining operations to assume the form of a cutting blade will be known as the body, working or blade portion 40 and the intermediate portion of the diamond interconnecting the shank and blade portions will properly be referred to as the neck 42.

The formation of shank 38 is now complete and it will remain chucked in mandrel 34 both for the remaining machining operations on the neck and blade portions and during its lifetime as a finished drill.

The next step in the formation of blade portion 40 is to form the back taper. Mandrel 34 is positioned in the V bearings with blade portion 40 adjacent cylindrical surface 24 and the V bearings are positioned, in a manner to be subsequently described, to tilt the axis of rotation 22 upwardly through a desired taper angle $\alpha$ shown in FIG. 7 so that neck portion 42, adjacent the mandrel, lies closer to the plane of surface 24 than does blade portion 40 remote from the mandrel. The V bearings are then lowered maintaining the desired taper angle $\alpha$, until neck portion 42 engages machining surface 24. Counter-rotation of the tool blank and disc accompanied by the timed stepwise lowering of axis 22 as indicated in FIG. 7 results in the formation of the back taper shown in FIG. 8 having the cross-sectional configuration illustrated at 44. In one specific embodiment, the reduction in neck diameter, indicated at 46, may be .002".

It will, of course, be obvious that the back taper could have been machined simultaneously with the cylindrical shaping of the rough end portion 16 thus combining the operations illustrated in FIGS. 5 and 7.

After the back taper has been formed, rotation of the tool workpiece is no longer required in the subsequent machining operations to be performed. Accordingly, and with reference to FIG. 9, the end of mandrel 34 remote from the diamond tool blank is locked in a counterbored adapter 48 by set screw 50 which adapter has a locating guide bore 52 and blade guide 54 which defines certain precise positioning locations required for subsequent machining operations. Blade guide 54 is flexible and formed with a small projecting rib 55 extending from a central location on its rear edge for a purpose which will become apparent as the description proceeds. Guide bore 52 and blade guide 54 bear a precise angular relationship to each other for a purpose which will become more apparent in the detailed description of the apparatus. At this point in the broad description based on the schematic illustrations of FIGS. 10–14 let it suffice to say that the blade guide 54 positions the mandrel and tool blank for front tapering (overtapering) operations and the bore guide 52 is used in conjunction with the formation of the blade point.

The formation of the front taper is the next step and this operation involves the machining of two diametrically opposed flats on the blade portion. Mandrel 34 is again positioned in the V bearings with tool blank axis 56 parallel to and spaced above cylindrical machining surface 24 and the resilient bias applied thereto. Mandrel 34 is not rotated at this point and blade guide 54 is engaged by corresponding guide structure to insure the precise positioning of the same. Tool blank axis 56 is then tilted downwardly relative to surface 24 as shown in FIG. 10 and lowered until the large end of the tool blank, remote from neck portion 42, engages the machining surface. The bearing assembly is then fed downwardly, as previously described, while surface 24 is rotated. This operation continues until the desired fore taper 58 is formed on one side of the tool blank as illustrated in FIG. 10 and more clearly shown in the cross-sectional views at 60. Mandrel 34 is then removed from the V bearings, rotated 180° about its own axis and reinserted in the V bearings with blade guide 54 maintaining such position and the front tapering operation repeated to form the opposing front taper clearly shown in FIG. 12 and particularly in the cross-sectional views at 60.

This concludes the operations performed at the preliminary work station. The remaining operations involve the machining of the cutting point at a finishing work station.

With mandrel 34 still secured in adapter 48 by set screw 50, the assembly is positioned at a finishing station (see FIG. 13) and secured against angular movement, about its own axis, by a pin passing through guide hole 52 in adapter 48 and corresponding bores at the finishing station. Guide bore 52 and blade guide 54 bear a small angular relationship to each other which defines a particular angular relationship between the point flats 62 to be formed at the finishing station and the front taper flats 58. The adapter and mandrel 34 can pivot, in a vertical plane, about the axis of a pin inserted through guide bore 52. The mandrel is yieldably biased against machining surface 24, as shown in FIG. 13, and overlies a fixed pin stop 64 which limits the downward movement of the diamond tool blank. The yieldable bias is schematically indicated at 66 in FIG. 13. Pin stop 64 serves a purpose analogous to the V bearings in that it defines the closest approach to machining surface 24 that may be attained by the tool blank. A hair spring provides the resilient bias to hold the tool blank against surface 24 with a force sufficiently light that thrust imparted thereto during the machining of the points may be tolerated by the diamond. When the mandrel is initially positioned as shown in FIG. 13, it will not engage stop 64; rather the sole support of the assembly at the end remote from guide pin receiving bore 52 is the end of the diamond tool blank and machining surface 24. The hair spring maintains the desired machining pressure between the diamond and the machining disc. When mandrel 34 comes to rest on stop 64, the pointing operation for one side is completed. The pin is then removed from guide hole 52, the adapter 48 rotated 180°, the pin reinserted and the operation repeated to conclude the pointing operation and the formation of a solid diamond drill shown in FIG. 14 which may now be used in a conventional V drilling machine in the normal manner.

It is to be understood that it is more desirable during each of the machining steps above described to perform the initial machining operation with a coarse diamond dust and then substitute a fine diamond dust for a polishing operation. It is also very desirable that the machining disc undergo a very small reciprocating motion, or flutter, parallel to its axis of rotation concomitantly with the rotation thereof. Such reciprocating motion is indicated by the double-headed arrow in FIG. 2. This precludes the formation of grooves in the machining and the machined surface by the diamond dust carried by the machining disc and in abrading contact with the workpiece.

The following detailed description of the equipment, shown in FIGS. 15–25, which is actually used to make solid diamond drills illustrates one manner in which the preceding machining steps may be performed.

The apparatus for practicing the method of making a solid diamond drill herein disclosed is illustrated in its entirety in FIG. 15 and includes a machining disc 26, a bodily adjustable preliminary work support station 68 where initial machining operations are performed on a diamond workpiece and a finishing work support station 70. Disc 26 is secured to shaft 72 which is mounted in bearing supports 74 for simultaneous rotary and reciprocatory motion. Rotation is imparted to disc 26 by motor 76 drivingly connected to pulley 78, secured to shaft 72, via flexible drive belt 80. Disc 26 is simultaneously reciprocated by a motor 82 imparting rotation to an adjustable eccentric 84 via flexible drive belt 86 and gear box 88. The motion of eccentric 84 is transmitted to shaft 72 via shaft 90 supported for reciprocation in bracket 92 and spring biased toward the eccentric by an adjustable spring housing assembly 94, shown in FIG. 16, urging shafts 72 and 90 in the direction of eccentric 84. A roller bearing 96 and ball bearing 98 engage eccentric 84 and shaft 72, respectively, for transmitting axial thrusts therebetween. The output shaft 100 from gear box 88 is loosely received within an oversize non-circular opening 102 in cam 84 whose true center is at point 104. Adjustment of the eccentric between positions aligning the true center 104 and an offset center 106 with the axis of shaft 100 provides the previously referred to adjustment of the eccentric. The desired adjustment is maintained by a nut 108 threaded on shaft 100.

It will be apparent that energization of motors 76 and 82 results in the simultaneous rotation and reciprocation of disc 26. The actual reciprocation undergone by the disc along the axis of shaft 72 is quite small, for example in the range of .015''–.125'', as will be apparent from the ensuing description.

Figure 16:
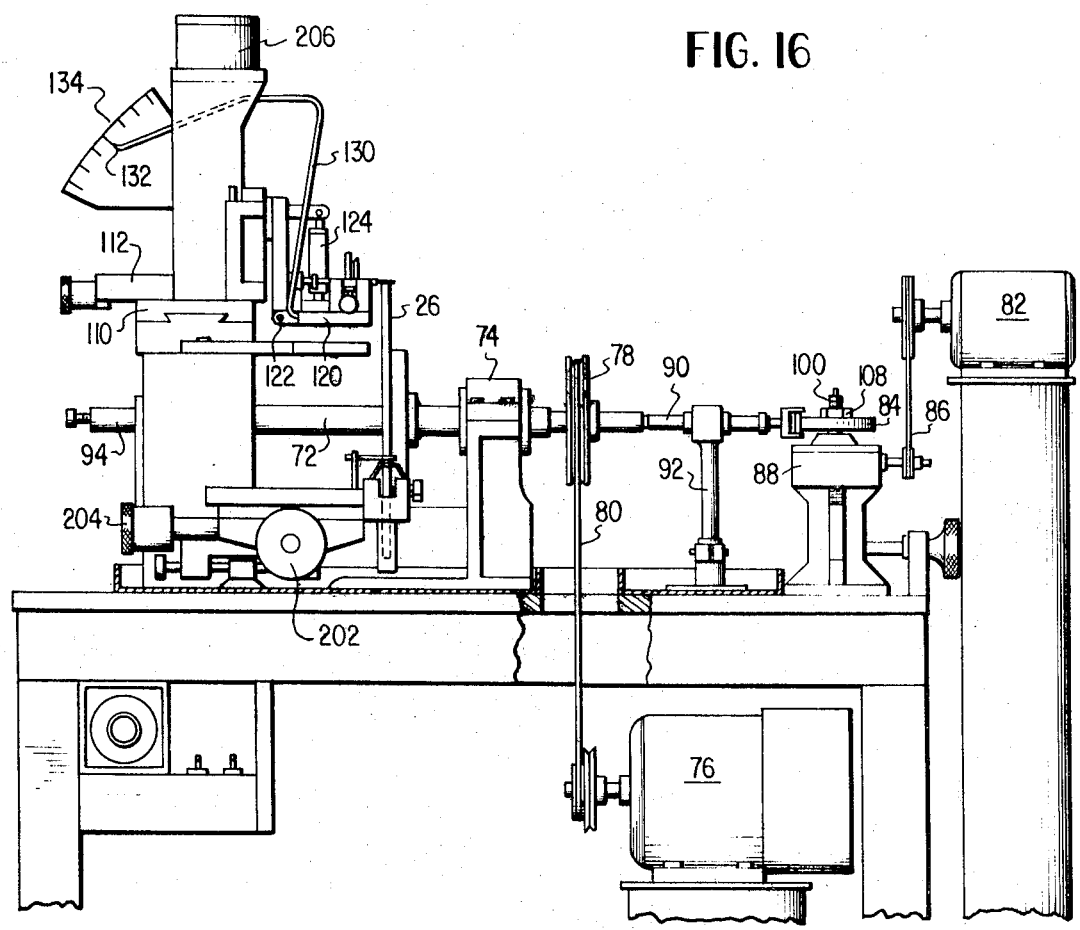
FIG. 16 is an elevational view, with parts broken away, of the front side of the equipment shown in FIG. 15.
Figure 18:
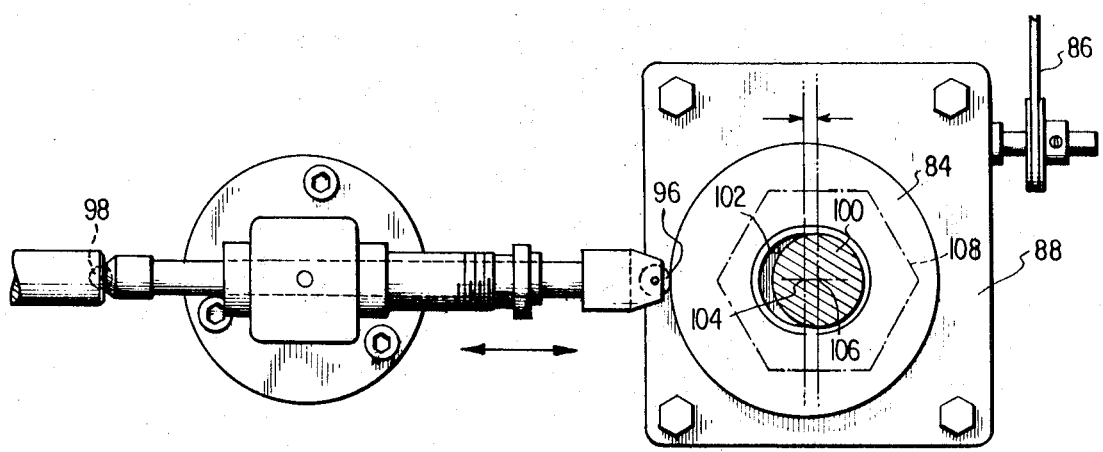
FIG. 18 is a fragmentary top plan detail view of an adjustable eccentric and follower which is shown in elevation in FIG. 16.
Figure 17:
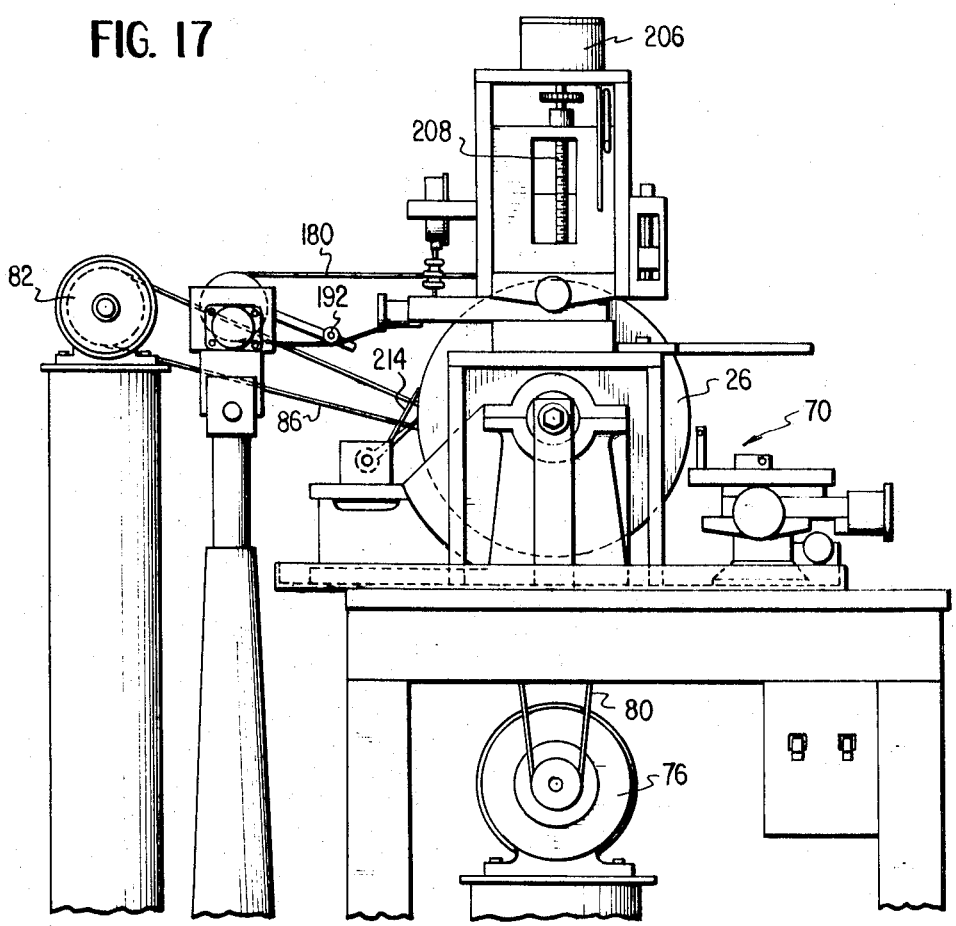
FIG. 17 is an end elevational view of the equipment as viewed from the left side of FIG. 16.
Figure 25:
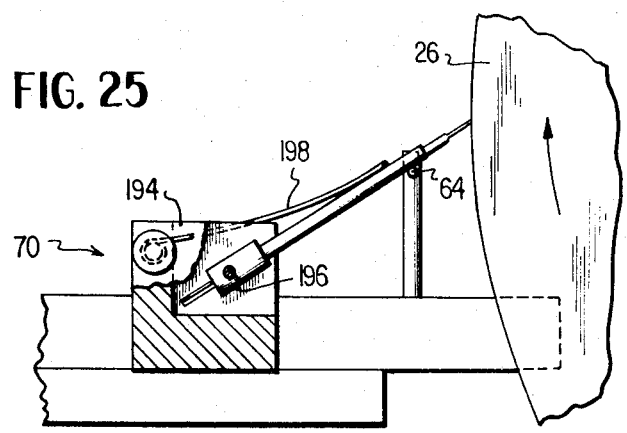
FIG. 25 is a view taken partly in elevation and partly in section along line 25—25 of FIG. 24.

Preliminary work support station 68 is mounted for linear three dimensional and angular adjustment relative to disc 26 through the intermediary of adjustable support structure which includes conventional X, Y, Z slide positioners 110, 112, 114 respectively, through which work station 68 may be linearly adjusted. Additionally, bracket 116 is mounted for angular adjustment relative to slide 114 about an axis 118 (FIG. 19) parallel to the axis of shaft 72. Arm 120 on which the actual work holding equipment is secured as shown in FIG. 16, is mounted on bracket 116 for angular adjustment about axis 122 which extends at right angles to the axis of shaft 72. Turnbuckle 124 interconnected between bar 126, rigid with bracket 116, and the side of arm 120 remote from axis 122 is herein illustrated as the means by which the adjustment between arm 120 and bracket 116, about axis 122, is effected. A plurality of conventional gauges 128 of any desired type are provided to register minute adjustments of the relatively moveable parts of the preliminary work station. An indicator arm 130 rigidly secured to arm 120 for angular adjustment therewith about axis 122 is provided with an indicating pointer 132 cooperating with angular scale 134 to indicate the elevational position of arm 120 relative to the horizontal and the remaining components of preliminary work station 68. The actual work supporting equipment 136 (FIG. 23) includes a generally U-shaped bracket 138 incorporating conventional jewel V's 140, a mandrel pressure biasing assembly 142, a stop block assembly 144 including stop shaft 146, set screw 148 and an indexing pin 150. Stop shaft 146 is provided with through bores 152 to receive indexing pin 150.

Biasing assembly 142 includes a trunnion 154 mounting a shaft 156 for rocking movement about pivot axis 158. A fork 160 is mounted at one end of shaft 156 and a leaf spring assembly 162 is mounted at the other end of the shaft. Hardened steel rollers 164 are carried at one end of the fork. Trunnion shaft 166 having a keyway coacting with set screw 168 is mounted in sleeve 170. An adjustable pressure adjustment mechanism 172 reacting against the undersurface of leaf spring assembly 162 biases the fork mounted rollers downwardly about the fulcrum defined by pivot axis 158.

An arm 174 rotatably supports a mandrel drive roller assembly 176 at one end thereof and is secured, at the other end, to a shaft 178 journalled in and bridging U-shaped bracket 138. Drive roller assembly 176 is biased downwardly against the mandrel positioned in the V bearings by a flexible drive belt 180 trained underneath two idlers 182, 184 freely mounted on shaft 178 and extending over a drive pulley 186 integral with the rubber surfaced pressure roller 188 of the drive roller assembly. Belt 180 is driven by motor 190 and tension is applied thereto by an idler 192. When a mandrel 12 or 34 is positioned in the V bearings, pressure roller 188 is biased thereagainst and rotated by drive belt 180.

Finishing work station 70 is radially aligned with disc 26 and includes a generally U-shaped bracket 194 having a locating pin 196 extending through aligned apertures in the opposite sides of the U-shaped bracket. A spring biasing assembly, consisting of a bent steel wire 198 is supported on a shaft 200 journalled in a cross-bore in the body of the U-shaped member 194 and coacts with a horizontally related stop shaft 64 to support the tool and mandrel in position for a finishing operation such as described in connection with the diagrammatic showing of FIG. 13. Support station 70 is provided with X, Y positioning calipers 202, 204 for positioning support station 70 relative to the machining disc.

It will be apparent that any or all of the slide positioners may be pre-programmed and/or automatically controlled in any known manner as by the use of conventional electric stepping motors such as illustrated at 206 for automatically controlling the down-feed rate of slide positioner 114 and its supported work station 68 through the intermediary of screw shaft 208 in accordance with known parameters. Such parameters may include the most advantageous down-feed rates for each of the operations previously described in connection with FIGS. 2, 5, 7 and 10. Diamond dust, in a suitable liquid carrier, is periodically applied to cylindrical surface 24 of disc 26 by an intermittently rotated applicator 210. The sequentially 360° counterclockwise rotation of the applicator brush into fountain 212 and onto disc 26 may be controlled in any desired manner such as by a preprogrammed stepper motor, not shown. Scraper element 214 positioned adjacent disc 26 returns excess liquid to the fountain and catch basin 216, underlying the disc, conserves that excess diamond suspension not removed by the scraper element.

In many instances it may be desirable to rotate the machining disc at upwardly of 2000 r.p.m. which elevated rotational speeds result in an excessive loss of diamond slurry due to its being thrown off the disc by centrifugal force. In such instances, it is preferable to extend the catch basin 216 substantially about the non-working peripheral portion of the disc and apply the slurry immediately in front (considered in the direction of rotation of the disc) of the work station and place the scraper immediately behind the work station. The slurry may be applied in such a situation by either dripping it on the disc or through the use of a brush applicator.

The stop block assembly and its mode of cooperation with the mandrels 12, 34 and adapter 48 is best illustrated in FIGS. 20–23. For those machining operations wherein mandrel 12 or 34 is rotated, such as those diagrammatically illustrated in FIGS. 2, 5 and 7, the stop block assembly is positioned as in FIGS. 20 and 23 with the rounded end of the mandrel, remote from the diamond, in engagement with a recess 218 formed in one end of stop shaft 146. Stop shaft 146 is provided with a slit 220 intersecting recess 218 which receives blade guide 54 of adapter 48 when mandrel 34 is to be held against rotation. With mandrel 34 held in adapter 48, the stop block assembly is in the position of FIG. 21. Stop shaft 146 is positioned in the two positions indicated in FIGS. 20 and 21 by the selective insertion of indexing pin 150 through one of the bores 152. One of the primary purposes of the stop block assembly is to insure the proper positioning of a rotating diamond workpiece relative to the machining disc and, in the case of the non-rotating workpiece operations, to provide known precise angular relationships for forming the flats 58.

Figure 19:
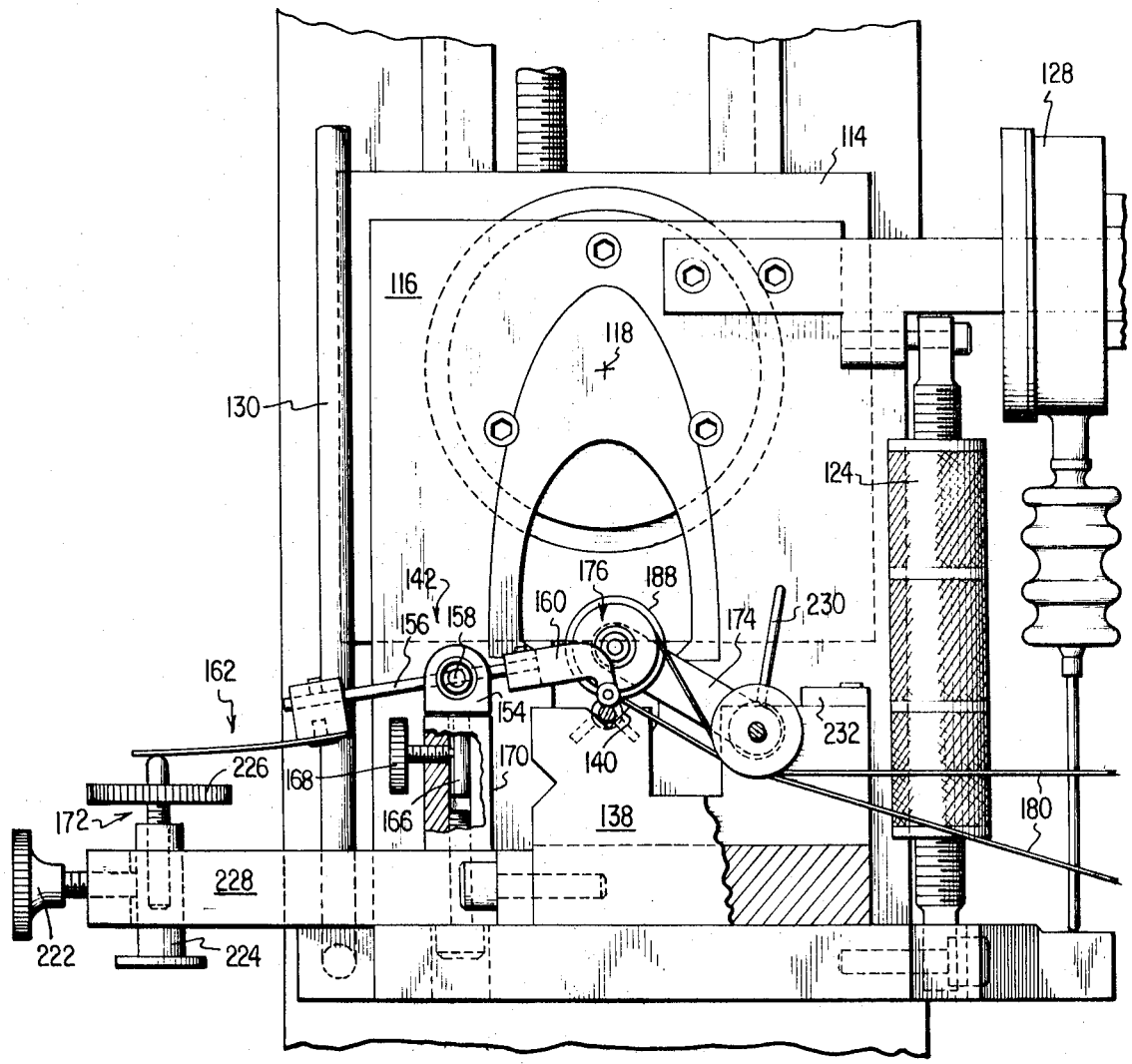
FIG. 19 is a detailed elevational view, with parts in section, of the preliminary work station illustrating the biasing and rotation of the workpiece in V bearings.
Figure 23:
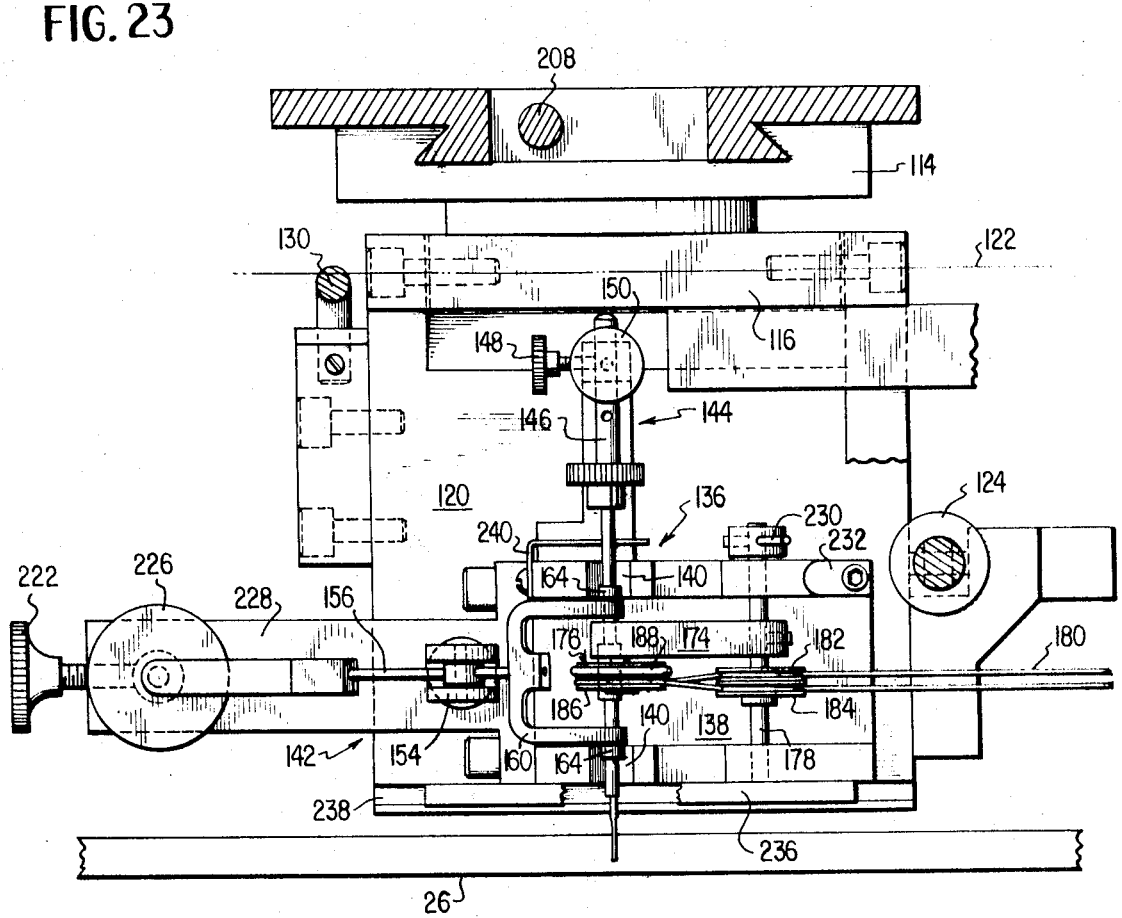
FIG. 23 is a top plan view, with parts broken away, of the preliminary work station which is shown in elevation in FIG. 19.
Figure 24:
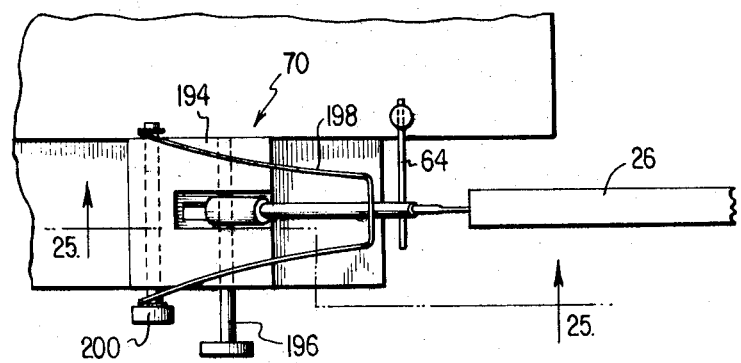
FIG. 24 is a top plan view of the finishing work station.

The manner in which a mandrel may be positioned in in and removed from the V bearings will now be described in connection with FIGS. 15, 19 and 23. In order to remove the mandrel supported diamond workpiece shown in working position in FIGS. 15, 19, and 23, set screw 222 is backed off and sleeve 224 of pressure adjustment mechanism 172 drops until the manual adjusting disc 226 strikes support 228. This releases the spring bias imposed on shaft 156 and fork 160 by leaf spring assembly 162 and allows the same to be pivoted counterclockwise about pivot 158 thus removing the downwardly directly resilient bias imparted to the mandrel by steel rollers 164. Lever arm 230, which is secured to shaft 178, is then rotated clockwise to pivot arm 174 carrying drive roller assembly 176 to an approximately vertical position. At this position, lever arm 230 lies below a pivotal stop block 232 which is then pivoted in a plane at right angles to the plane of pivotal movement undergone by lever arm 230 until the stop block overlies the lever arm thus preventing its return to the FIG. 19 position. Clockwise rotation of pivot arm 174 and the drive roller 176 journalled thereon places belt 180 under tension which may be compensated for by the upward yielding of idler 192 whose supporting arm 234 may be biased downwardly by a suitable spring, not shown. Alternatively, the flexible belt 180 may simply be manually tensioned to remove the same from idler 192 prior to the rotation of lever arm 230 in a clockwise direction. Thus with the resilient downward bias imparted to the mandrel by rollers 164 and pressure roller 180 removed, the mandrel supported diamond workpiece may be removed from the V bearings. The insertion of a rotatable mandrel is performed by simply reversing the foregoing procedure.

When it is desired to insert a non-rotatable mandrel, as in the formation of flats 58, the end of mandrel 34 is first secured in adapter 48 by set screw 50. The stop block assembly is then backed off to the position shown in FIG. 21 and the blade guide 54 inserted into slit 220. There is a precise desired angular relationship between the axes of bores 152, the plane of blade 54 and the axis of bore 52 in the adapter. Inasmuch as blade 54 is formed from a flexible material such as spring steel, the mandrel and diamond workpiece carried thereby may undergo deflections away from axis 22 in a plane perpendicular to a plane occupied by blade 54. Protuberance 55 on blade 54 is bottomed in the end of slot 220 and defines a fulcrum about which the blade and its integrally related adapter, mandrel and diamond workpiece may undergo limited movement in a plane occupied by blade 54 and which, considered with the flexibility of blade 54, accommodates movement of the workpiece in perpendicularly related planes away from axis 22 as lateral forces are imposed on the workpiece in excess of those known forces which the diamond may successfully resist during the back tapering operations.

An understanding of the following detailed description of the actual formation of a solid diamond drill will be facilitated by continued reference to the diagrammatic showings of FIGS. 1–14 in conjunction with the description of FIGS. 15–25.

After the rough diamond chip 10 is secured in the counterbored end of mandrel 12, as described in connection with FIG. 1, the stop block assembly is positioned as in FIG. 20 and mandrel 12 is positioned in the V bearings with the end thereof remote from the workpiece abutting recess 218. A known downward force is then applied to mandrel 12 through rollers 164 by adjusting calibrating disc 226 upwardly. Disc 226 may be provided with appropriate calibration markings corresponding to known lateral forces that can be tolerated by the particular $L/D$ size workpiece being machined. During the calibrating manipulation of disc 226, the additional downward bias applied to the mandrel through pressure roller 188 and its associated flexible drive belt 180 is taken into consideration. A slotted rubber shield 236 is then positioned in groove 238 to preclude the possibility of diamond slurry being transmitted from the machining disc to the various moving parts of the preliminary work station.

The X, Y positioners are then manipulated as necessary to position the diamond workpiece in substantial parallel vertical alignment with the axis of shaft 72 and in overlying relationship to the cylindrical surface 24 of disc 26. Motor 206 is then energized to drive screw 208 in the appropriate direction until the high point of workpiece 10 just engages machining surface 24. Motors 76 and 82 are then energized to cause rotation and limited reciprocation of machining disc 26 as previously explained. Motor 190 is next energized to impart rotation to mandrel 12 through pressure roller 188. The axis of rotation 22 of the diamond workpiece, when no forces are applied by the machining disc, is obviously that defined by mandrel 12 rotating in the V bearings support so that axis 22 is a common axis of rotation for both the workpiece and mandrel.

A very important feature of the invention resides in the fact that the downward resilient bias imparted to the mandrel through rollers 164 and 188 is so selected that upon the application of an upwardly directed force of known magnitude being imparted to the diamond workpiece by virtue of the high point of the rough diamond engaging the machining disc; the workpiece may move bodily upwardly away from surface 24. The lateral forces that may be tolerated by a known $L/D$ diamond workpiece is determined empirically and, after taking into consideration the length of the lever arm which would be defined between the effective point of downward pressure application and the possible points of engagement between the workpiece and machining disc; the downward bias imparted through rollers 164 and 188 is so selected as to yield before lateral forces sufficient to fracture the diamond are applied thereto. Thus if the initial engagement of the high point of the diamond workpiece and the machining disc were perfectly selected the high point of the diamond would gradually be worn away due to the counter rotation of these two elements without the workpiece ever being deflected upwardly away from the axis of rotation 22 defined by the V bearings. Normally, however, the workpiece will move upwardly as the high point engages surface 24 and return to the original axis of rotation as the high point passes the machining surface. Motor 206 is preprogrammed to intermittently move the whole preliminary work station downwardly after a sufficient period of time has elapsed to insure that the initial high point has been machined away. As intermittent downward movement of the work station continues over a period of hours the outer end of the workpiece assumes the cylindrical configuration shown in FIG. 2. It must be clearly understood that as the axis of rotation 22 is intermittently shifted downwardly, as from the position of FIG. 1 to that of FIG. 2, the workpiece is free to move upwardly away from surface 24 at all times if the lateral forces imparted thereto exceed the known maximums.

After one end of the diamond is machined to the configuration shown in FIG. 2, mandrel 12 is removed from the V bearings, and the workpiece removed from its counterbored end. The cylindrical end is then press fitted into its permanent mandrel 34 as indicated and discussed in connection with the description of FIG. 4. Motor 206 is reversed to raise the preliminary work station, mandrel 34 is positioned in the V bearings in abutting engagement with recess 218 and the foregoing procedure of intermittently lowering the workpiece is repeated, as indicated in FIG. 5, until the overall length of the workpiece is cylindrical as shown in FIG. 6.

The next machining step involves the formation of a back taper of circular cross-section. With mandrel 34 remaining in the V bearings, motor 206 is energized to raise the work station and turnbuckle 124 is adjusted to pivot the arm 120 and its integrally connected preliminary work station upwardly relative to surface 24 about axis 122. The degree of adjustment depends on the back taper desired and is indicated, in FIG. 7, by the angle $\alpha$. The desired angle $\alpha$ may be directly read from scale 134 since pointer arm 130 is rigidly carried by arm 120 for angular adjustment therewith about axis 122. Motor 206 is then energized to bodily lower the work station until an intermediate portion of the workpiece, which is to be the smallest diameter portion of the neck indicated at 46, just engages the machining disc. The work station is subsequently fed downwardly, as indicated in FIG. 7, until the back tapering operation is completed as indicated in FIG. 8.

The formation of the back taper concludes those machining operations wherein the workpiece is rotated. The remainder of the machining operations require precise angular positional relationships between the workpiece and machining disc while yet retaining the yieldability of the workpiece and its constant bias toward that axial position of the mandrel defined by its rest position in the V bearings. For this purpose, an adapter 48 is provided as best shown in FIGS. 9 and 21. Following the back tapering operation, mandrel 34 is removed from the V bearings and secured in the counterbored end of adapter 48 by set screw 50. The stop block assembly is then backed off to the position of FIG. 21, and mandrel 34 is positioned in the V bearings with blade guide 54 received within slit 220 and projection 55 engaging the rear of slit 220. Leaf spring 240 reacting against adapter shoulder 242 biases the adapter to the left as viewed in FIG. 21. As will be apparent from an inspection of FIG. 21, mandrel 34 is held against rotation but may move upwardly, under the influence of excessive forces applied to the workpiece, by pivoting about the fulcrum defined by the engagement of projection 55 with the rear flat surface of slit 220. Indexing pin 150 insures the fixed angular positioning of stop shaft 146.

Inasmuch as the mandrel is not rotated in the fore tapering operation to be described; motor 190 is deenergized and pressure roller arm 174 is locked in the raised position by abutment stop 232 and the necessary downward bias is applied to mandrel 34 by the spring assembly acting through rollers 164 alone.

With the parts in the position shown in FIG. 21, work station 68 is raised and turnbuckle 124 is adjusted to pivot arm 120 and the work station downwardly, as viewed in FIG. 20, about axis 122 to a desired degree as may be determined from scale 134 for the purpose of machining the diametrically opposed fore tapering flats. Motor 206 is then energized to lower the work station until the outermost end of the workpiece just engages surface 24. Subsequent intermittent downward movement then continues until the position of FIG. 10 is reached whereupon the formation of one of the fore tapering flats is complete. The mandrel and adapter are then removed from the work station, rotated 180° about their own axes, and reinserted in the V bearings for a further machining operation identical with that just described to form the second fore tapering flat 58 as indicated in FIG. 11. This completes the machining operations at the preliminary work station and the workpiece, having the configuration shown in FIG. 12, is now transferred along with the mandrel and adapter to the finishing work station 70.

At the finishing work station, pin 196 is inserted through bore 52 in adapter 48 which, it will be recalled, is angularly offset relative to the plane of blade 54. Hair spring 198 is then forced downwardly against mandrel 34 by calibrating manipulation of shaft 200 to resiliently bias the workpiece against machining surface 24. At this point, mandrel 34 is supported solely by pin 196 at one end and the diamond workpiece engaging disc 26 at the other end. As the disc is rotated in the direction indicated in FIG. 25, one of the point flats is formed and the pointing of this flat is complete when the mandrel comes to rest against stop bar 64. Pin 196 is then withdrawn, mandrel 34 is rotated 180° about its own axis, the pin is reinserted and the pointing operation is repeated to produce the finished drill shown in FIG. 14.

In most instances, it will be desirable to initially charge fountain 212 with relatively coarse diamond dust, such as #15 diamond powder suspended in an organic liquid carrier, and then substitute a finer diamond dust such as #3 powder in connection with each of the separate machining operations The fine dust in the micron size range, of course, imparts a high polish to the workpiece. One reason for concluding each machining operation with a polishing operation is to preclude the formation of a finished matté surface which is characteristic of the finish obtained with coarse powder. Such at matté finish leaves microscopic hills and valleys on the working edges of the diamond drill. Not only is the sharpness of the drill decreased by such a matté finish resulting in the necessity for greater infeed pressures to perform subsequent drilling operations, but the material being drilled tends to pack in the microscopic undulations to produce galling.

Although the energization of work station vertical positioning motor 206 in connection with the various machining operations has been referred to as an intermittent one, it will be apparent that the downward travel of the preliminary work station could be continuous if the geared reduction is sufficiently great to insure a very slow downward travel.

The machining operations herein described may be more specifically defined depending upon the material from which the disc 26 is made. Thus, if disc 26 is formed from hardened steel, the machining operations described are essentially lapping operations whereas if disc 26 is a softer metal so that the diamond dust can be embedded therein the machining operations are more akin to grinding.

The drill shown in FIG. 14 may now be positioned in conventional Vee microdrilling equipment with no modification other than the securement of a drive pulley to mandrel 34 whereby the mandrel becomes the rotating machine part in which the drill is chucked. Exemplary of such microdrilling equipment is that manufactured and sold by National Jet Company, Cumberland, Md. under model designation 7M and further illustrated and described in National Jet Company Technical Bulletin M7–967.

In FIG. 26 is diagrammatically illustrated a modified drive system for imparting a positive intermittent rotation to the workpiece whereby the same may be formed in multi-faceted, rather than circular, cross-sectional configuration. It will be appreciated that the modified drive system shown in FIG. 26, wherein primed reference characters refer to corresponding parts in the remaining figures, may simply be substituted for the corresponding elements best shown in FIGS. 19 and 23. Timing belt 180' driven by a conventional stepper motor, not shown, imparts positive drive to mandrel 34 through drive roller assembly 176' and a sleeve gear 243 secured to the mandrel. Drive roller assembly 176' includes timing belt drive pulley 186' and integrally related drive gear 188'.

Selective energization of the timing belt stepper motor permits any desired number of flats or facets to be formed on the diamond workpiece as indicated by the multi-faceted workpiece 10' shown in FIG. 27 since the positive drive train shown in FIG. 26 allows the mandrel supported workpiece to be held against rotation until the stepper motor produces a further incremental rotation of the same.

A diamond workpiece having the cross-sectional configuration shown in FIG. 27 may then be further shaped for use in a gem setting or it may be constantly rotated in the manner previously described to produce the desired circular cross-sectional configuration for forming a diamond drill.

The advantages to the jewelry industry in being able to produce faceted stones in this manner rather than by the time-consuming and laborious techniques previously known are obvious.

Once the fundamental machining operations in connection with the formation of a solid diamond microdrill (i.e. those machined from a single diamond) are understood, then the application of the same principles to much larger drills made up of a plurality of structurally integral diamond chips becomes obvious. Thus, in FIGS. 28 and 29 is illustrated a solid composite rough diamond workpiece 244 comprising a central elongated steel or other rigid support rod 246 surrounded by a plurality of rough diamond chips 10″ which diamond chips and support rod are structurally integrated by a suitable adhesive. The support rod 246 could be completely embedded within the rough diamond chips 10″ and the same handled in the manner previously described in connection with the formation of the single solid diamond drill or one end of support rod 246 may extend beyond the surrounding diamond chips to function as the supporting mandrel. In either event, the integration of a plurality of rough diamond chips in the manner illustrated in FIGS. 28 and 29 produces a solid composite diamond workpiece which may be machined in the manner previously described to produce a solid composite diamond microdrill.

What is claimed is:

1. A method of machining diamond drills, comprising; positioning an elongate diamond workpiece adjacent a rotating endless machining tool; steps for machining distinct shank and working portions on said workpiece; said steps including resiliently biasing said workpiece against said tool for bodily movement toward and away from said tool in first and second distinct machining positions; machining said workpiece in each of said positions; and limiting the machining of said workpiece in each of said positions.

2. The method of claim 1 wherein said steps further include rotating the workpiece in a direction opposed to the direction of rotation of the endless tool and sequentially moving the axis of rotation of said workpiece in the direction of said tool.

3. The method of claim 1 wherein said steps include machining at least a portion of said workpiece with a circular cross-sectional back taper.

4. The method of claim 1 wherein said steps include machining the entire length of said workpiece into cylindrical form.

5. The method of claim 3 including the additional step of machining diametrically opposed front tapering flats on said back tapered portion.

6. The method of claim 5 including the additional step of machining a point on said workpiece.

7. A method of machining solid diamond drills comprising, rotating an elongate solid diamond workpiece in non-captive bearings about an axis defined by said bearings and lying in a plane substantially parallel to and spaced from a plane containing a tangent to a counter rotating machining surface, continually biasing the rotational axis of said workpiece toward coincidence with said first named axis, and sequentially moving said planes closer together.

8. A method of machining, comprising, steps for machining a solid diamond drill, said steps including rotating a solid diamond workpiece having a non-circular cross-section about a bearing defined axis of rotation in at least partial peripheral machining engagement with a machining surface, bodily displacing said rotating workpiece away from said machining surface and out of coincidence with said axis of rotation, and returning said rotating workpiece in the direction of said machining surface and into coincidence with said axis of rotation.

9. The method of claim 8 including repeatedly displacing and returning the rotating workpiece away from and into coincidence with said axis of rotation for sequentially enlarging the peripheral machining engagement between said workpiece and machining surface.

10. The method of claim 9 further including the step of moving said bearing defined axis of rotation in the direction of said machining surface, and continuing to displace and return said rotating workpiece out of and into rotational coincidence with the movable bearing defined axis of rotation until said workpiece is machined to a circular cross-section.

11. The method of claim 10 further including steps for machining said workpiece with a back taper.

12. The method of claim 11 further including the step of holding said workpiece against rotation with the circular cross-sectional axis thereof in coincidence with said bearing defined axis of rotation, tilting said bearing defined axis and workpiece, moving said machining surface relative to said workpiece, and displacing and returning the axis of said circular cross-sectional workpiece out of and into coincidence with said bearing defined axis for forming a fore taper.

13. The method of claim 12 further including the step of machining a point on said workpiece.

14. A method of machining a solid diamond drill from a solid elongate diamond workpiece, comprising, the steps of separately machining axially spaced shank and working portions on said solid diamond workpiece, and said steps including the step of rotating said workpiece about its longitudinal axis.

References Cited
UNITED STATES PATENTS

| | | | |
|---|---|---|---|
| 90,824 | 6/1869 | Dickinson | 51—283 |
| 557,980 | 4/1896 | Evard | 51—283 X |
| 1,110,428 | 9/1914 | Edison | 51—283 |
| 1,213,164 | 1/1917 | De Graff | 51—283 |

LESTER M. SWINGLE, Primary Examiner

U.S. Cl. X.R.

51—105, 283; 77—67; 125—30